United States Patent [19]

Cappon

[11] 3,719,932

[45] March 6, 1973

[54] BIT ORGANIZED INTEGRATED MNOS MEMORY CIRCUIT WITH DYNAMIC DECODING AND STORE-RESTORE CIRCUITRY

[75] Inventor: Arthur M. Cappon, Boston, Mass.

[73] Assignee: Sperry Rand Corporation, Great Neck, N.Y.

[22] Filed: April 27, 1972

[21] Appl. No.: 247,977

[52] U.S. Cl. ........340/173 R, 340/173 DR, 307/238, 340/172.5

[51] Int. Cl. ..........................................G11c 11/40

[58] Field of Search .....340/173 FF, 173 R; 307/238, 307/279

[56] References Cited

UNITED STATES PATENTS 3,387,286 6/1968 Dennard..............................340/173

*Primary Examiner*—Terrell W. Fears
*Attorney*—Howard P. Terry

[57] ABSTRACT

A digital memory employing a matrix of known variable threshold transistor memory cells arranged in rows and columns. A first address decoder includes a push-pull output which applies an addressed voltage to the gates of transistors in the addressed row of memory cells and a not-addressed voltage to the remaining rows. A second address decoder operates through I/O and storage circuits to permit a single bit of information to be read into or out of the addressed memory cell in a selected column. The memory operates in a five-phase operating cycle. During the first and second phases, appropriate voltages are applied to the gate electrodes of the addressed and non-addressed rows of memory cells and all source and drain lines in the matrix are charged through the I/O and storage circuits. During the third phase, information in each memory cell in the addressed row is read into a temporary storage transistor in the I/O and storage circuits. During the fourth phase, all memory cells in the addressed row are cleared. During the fifth phase, information is re-written into each memory cell from the corresponding temporary storage transistor in the I/O and storage circuits unless new information is to be written into the memory cell selected by the second decoder, in which case the new information is introduced at this time.

7 Claims, 3 Drawing Figures

BIT ORGANIZED INTEGRATED MNOS MEMORY CIRCUIT WITH DYNAMIC DECODING AND STORE-RESTORE CIRCUITRY

BACKGROUND OF THE INVENTION

1. Field of the Invention

This invention relates to digital memory circuits and more specifically to READ/WRITE memory circuits employing variable threshold transistor memory cells.

2. Description of the Prior Art

A wide variety of digital memory circuits employing integrated circuit techniques is known in the art. Recently, digital memory circuits have been developed which employ a variable threshold field effect transistor memory cell described and claimed in U.S. Pat. No. 3,590,337 issued to H. A. R. Wegener and assigned to the present assignee. Application of a relatively large gate-substrate WRITE voltage shifts the conduction threshold in such transistors in a direction dependent upon the polarity of the large gate voltage. The conduction threshold remains in the shifted condition for a prolong period of time unless subjected to another WRITE voltage, and thus provides the "memory" function of the device. Subsequent application of a smaller READ voltage permits source-drain current flow in accordance with the condition of the conduction threshold with little effect on that threshold.

Although a single interrogation of such devices causes an insignificant change in the conduction threshold of the device, some applications involve megabit interrogation rates so that significant drift in the conduction threshold can occur over a relatively short period of time. Prior art memory circuits using variable threshold transistors as memory cells may thus be unsuitable for use in such applications.

Although the variable threshold transistors can be designed to have a highly stable conduction threshold, such devices display a concomitant decrease in write-in speed which results in an intolerably long access time. Conversely, prior art circuits may use variable threshold transistors designed to provide a fast write-in time, but this necessarily implies a faster decay time so that the long term storage possibilities of such memories are not realized.

Furthermore, some of the prior art memory circuits exhibit relatively high levels of "cross-talk" and require considerable power.

SUMMARY OF THE INVENTION

The memory of the present invention employs a push-pull address circuit which clamps non-addressed as well as addressed gate lines in the memory matrix so as to reduce cross-talk. Information in non-addressed memory cells is temporarily retained in a storage register and used for periodically refreshing the entire memory to compensate for threshold drift.

DESCRIPTION OF THE PREFERRED EMBODIMENT

Figure 1:
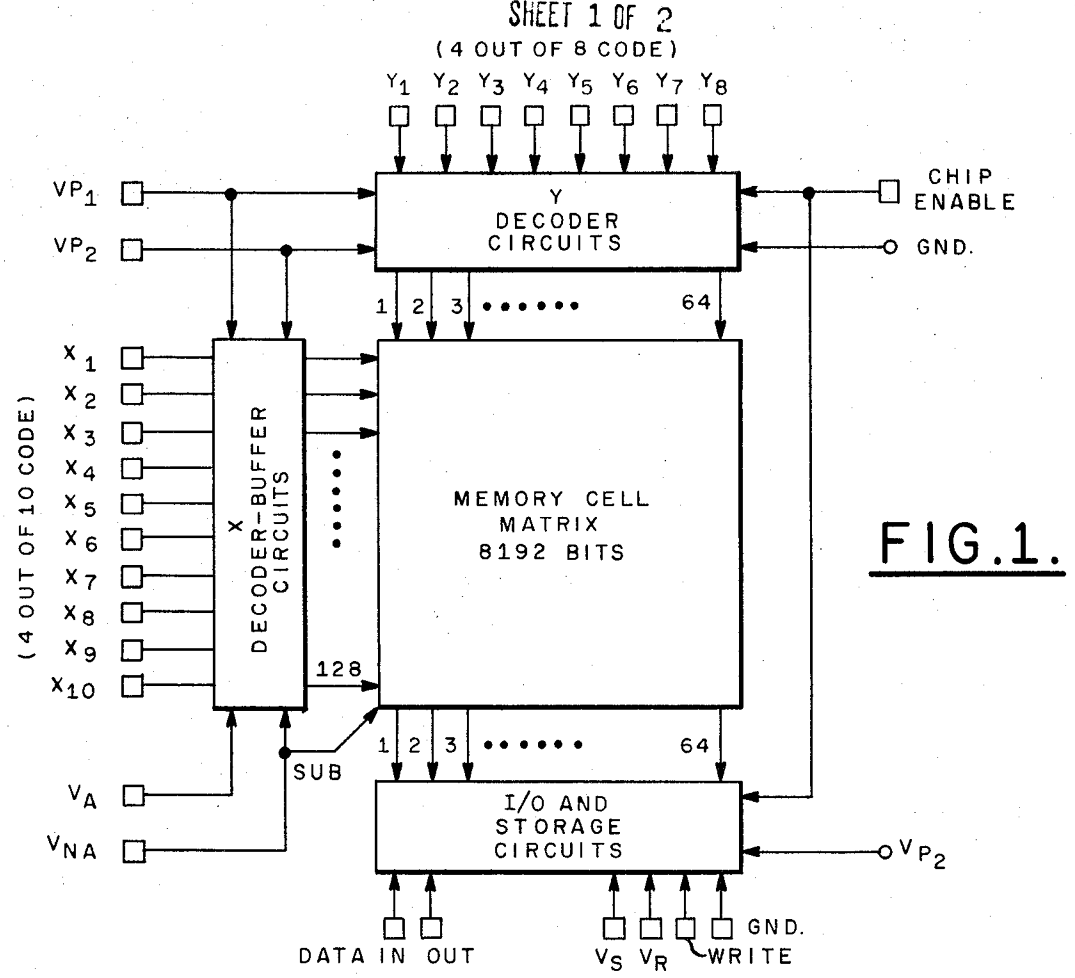
FIG. 1 is a block diagram illustrating a memory circuit employing the principles of the invention.

FIG. 1 illustrates a typical memory constructed in accordance with the invention which is capable of storing 8,192 bits. The memory cell matrix is arranged in 64 columns and 128 rows of individual memory cells.

The decoder circuits accept majority codes. Thus, the Y decoder circuits provide a signal to the memory cell matrix upon the reception of four Y signals. The particular column of memory cells which is energized in response to the reception of such signals is uniquely determined by the particular combination of Y signals received. Similarly, the X decoder circuits provide a signal to a particular row of memory cells when four of the 10 X input terminals are energized.

Each memory cell in the matrix contains a variable threshold transistor. Each output line from the X decoder circuits is connected to the gate electrodes of all variable threshold transistors in the corresponding row.

Since the matrix rows are formed by connecting the gates in common, all devices in a given row must be "-cleared" simultaneously. To accomplish this, the contents of the entire row are temporarily stored in an auxiliary register and subsequently rewritten into the memory cell when any device in the row is selected for a WRITE operation. This function is accomplished in the bank of 64 I/O and storage circuits.

Figure 2:
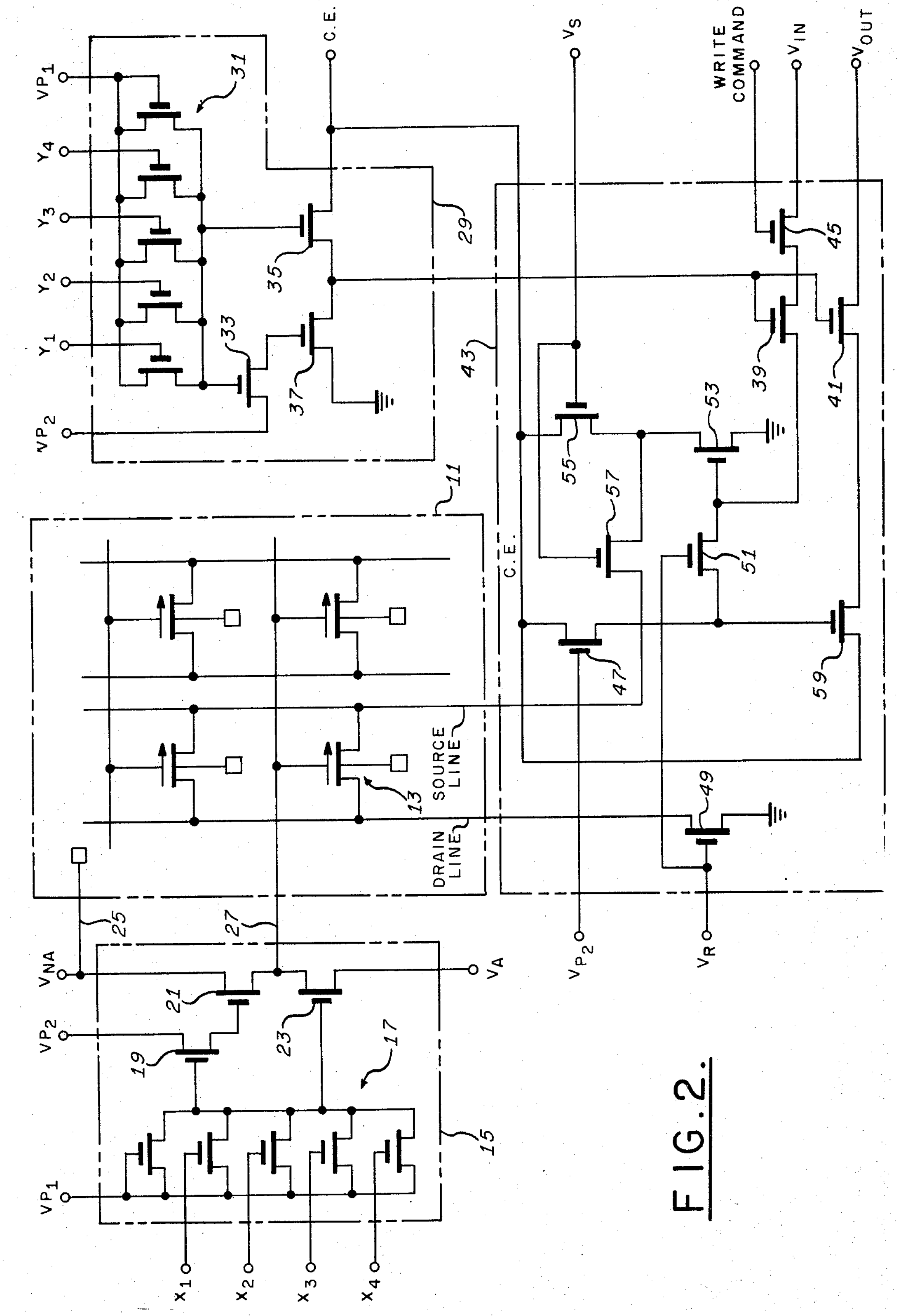
FIG. 2 is a schematic diagram illustrating a circuit useful in practicing the invention.

The schematic diagram of FIG. 2 illustrates the manner in which the various components of the memory of FIG. 1 are constructed and interconnected. FIG. 2 has been simplified by showing only four variable threshold transistor memory cells in the memory cell matrix 11 and the complete connections to only the memory cell 13.

The matrix 11 is located in an electrically isolated structure in order to permit the memory cells to be "threshold-shifted" with either positive or negative gate-to-substrate potentials using only negative voltage sources. Such electrical isolation can readily be achieved by diode diffusion techniques well known in the art.

The X decoder 15 contains a bank of decoder transistors 17. This bank of transistors includes an individual transistor corresponding to each of the four X input lines and an additional transistor line responsive to a precharge timing pulse $VP_1$. The output of the bank of decoder transistors is applied to the gate electrode of a switching transistor 19 whose source terminal is connected to receive negative-going $VP_2$ precharge pulses. The output of the switching transistor 19 is applied to the gate electrode of a first buffer transistor 21 which is energized from a power supply providing a not-address voltage $V_{NA}$. A second buffer transistor 23 is connected in series with the transistor 21 and energized from a second power supply supplying an address voltage $V_A$. The $V_A$ power supply is capable of providing a negative WRITE potential or a reduced negative READ potential as will be explained.

The not-address voltage $V_{NA}$ is applied to the substrate 11 through a line 25 so that the substrate of each of the variable transistor memory cells in the memory matrix is at the $V_{NA}$ voltage level.

A gate line 27 is connected to the junction of the buffer transistors 21 and 23. This common gate line is connected to the gates of all memory transistors in a given row in the matrix.

The Y decoder 29 contains a second bank of decoder transistors 31 identical to the bank of decoder transistors 17 in the X decoder 15. A pair of series connected transistors 35 and 37 is connected serially between a source of "chip enable" (CE) voltage and ground. The gate electrode of the transistor 35 is connected directly to the output of the bank of decoder transistors 31 and the gate electrode of the transistor 37 is connected to the output of the switching transistor 33.

The junction between the transistors 37 and 35 is connected to input and output switching transistors 39 and 41 in the I/O and storage circuit 43.

Information may be written into a memory cell through a WRITE input transistor 45 in the presence of a WRITE command signal applied to the gate electrode of that transistor.

The I/O and storage circuits include store and restore circuitry which provides means for writing and reading the state of the memory devices in the memory matrix and also contains means for temporarily storing the contents of an entire row of variable threshold transistor memory cells during WRITE operations. As will be explained later, since the gates of all of the memory transistors in a given row are connected together, the conduction thresholds of all of the transistors in a given row are shifted during a "clear" operation. During this time, therefore, the store circuits retain the information from the affected memory cells until this information can be subsequently re-written into the appropriate memory cell in the memory matrix.

A source line transistor 47 permits a negative chip enable voltage to be applied to the source line in the associated column of memory transistors in response to a precharge voltage $VP_2$ applied to its gate electrode. The drain line in the same column of memory transistors may be connected to ground through a drain line transistor 19 in response to a $V_R$ voltage applied to its gate terminal. The $V_R$ pulse is also applied to the gate terminal of a gating transistor 51 which couples the source line to the gate electrode of a temporary storage transistor 53. The transistor 53 is coupled through a load transistor 55 to the chip enable voltage line, and through a transmission gating transistor 57 to the source line in the column of memory cells. The transistors 55 and 57 are switched in accordance with store command signals $V_S$ applied to their gate electrodes. Information may be read out of the memory through a readout transistor 59 connected to apply chip enable voltages to the voltage output terminal in accordance with the voltages applied to its gate electrode from the source line of the corresponding column of memory cells.

It will be understood that FIG. 2 has been simplified for purposes of explanation. The X decoder 15, for instance, represents only one of the 128 X decoder circuits indicated in FIG. 1. In actual practice, a separate decoder circuit would be available for each row of memory cells in the matrix. Each decoder circuit would be essentially the same except that it would be connected to receive a unique combination of four of the 10 X address inputs.

Similarly, the Y decoder circuit 29 is illustrative of the total of 64 decoder circuits necessary to select any single column of memory cells.

In the same fashion, only one of the 64 I/O and storage circuits has been illustrated in FIG. 2. In actual practice a similar circuit would be supplied for each column of memory cells.

Since only one transistor is selected at a given time, however, only one input pin and one output pin need be provided for the entire bank of I/O and storage circuits. In a typical arrangement, the output lines of the individual I/O and storage circuits can all be connected to the single output pin and this pin can be coupled to ground through a suitable resistor. A conventional sense amplifier can then be used to detect the state of the selected memory cell.

Figure 3:
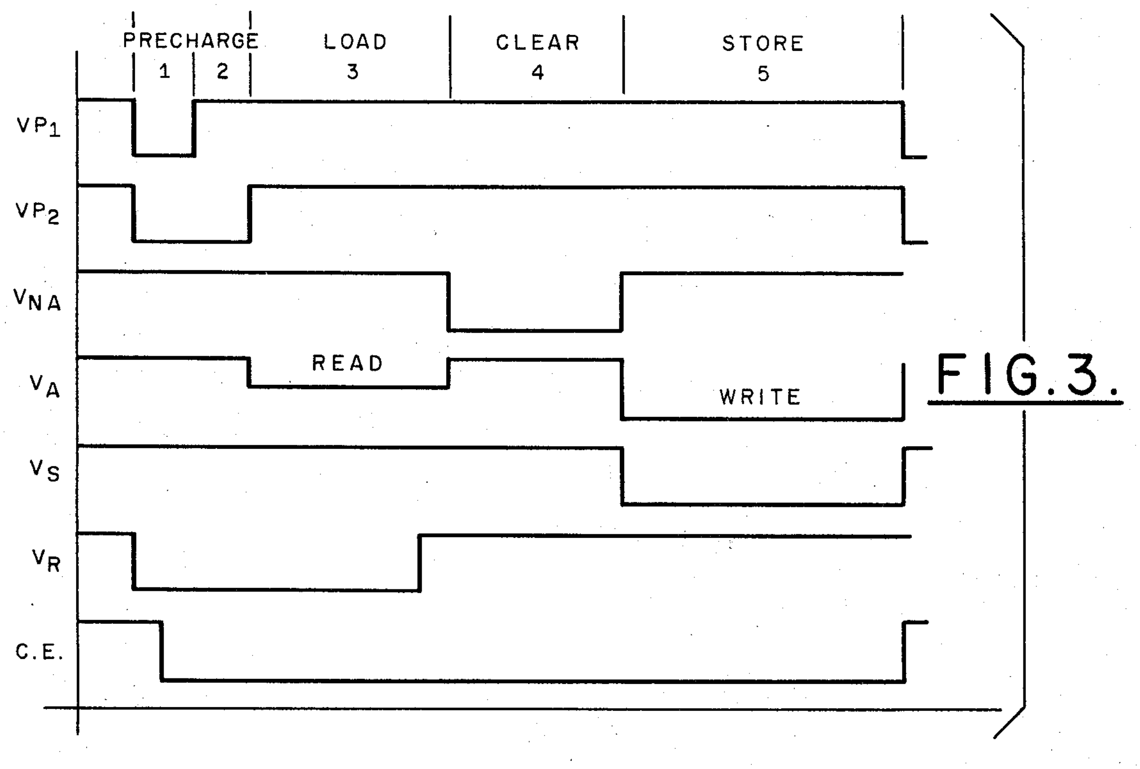
FIG. 3 is a timing diagram useful in explaining the invention.

The operation of the memory may be understood by referring to FIG. 2, together with FIG. 3 which represents a timing diagram for the circuit of FIG. 2.

In a typical variable threshold transistor memory cell, application of a negative gate-substrate voltage of 30v will shift the conduction threshold to its "negative extreme" of −19v. Application of a positive gate-substrate voltage of 30v will shift the conduction threshold to its "positive extreme" of −11v. Subsequent application of a READ pulse of −15v, for example, will drive the transistor into conduction only if the conduction threshold is at its positive extreme.

Assuming variable threshold transistors having these characteristics are chosen for the present application, all voltages depicted in FIG. 3 might have amplitudes of −30 volts except the READ portion of the $V_A$ which might have a value of −15 volts.

The entire operating cycle consists of five "phases," of which the first two are designated as a "precharge" cycle as indicated in FIG. 3.

It should be noted that all transistors in the circuit of FIG. 2, with the exception of the memory cells, are conventional fixed threshold, insulated gate field effect transistors. Although such transistors display no memory characteristics as such, a voltage applied to their gate electrodes will charge device input capacitances so that some delay is inherent in such devices. Because of the high switching speeds used in modern memories, such delay can be utilized for temporary memory.

During phase 1 of the precharge cycle, precharge voltages $VP_1$ and $VP_2$ are both applied to the memory circuit. Application of $VP_1$ to the X decoder 15 causes the uppermost transistor in the bank of decoder transistor 17 to conduct thus applying negative gate voltages to the transistors 19 and 23 so as to render these transistors conductive. Since a $VP_2$ voltage is also applied to the transistor 19 at this time, the gate electrode of the transistor 21 will also be driven negative which will drive this transistor into conduction.

A given decoder bank 17 is considered to be addressed when the voltages applied to each X terminal associated with the bank is such that each of the corresponding transistors is cut off. Therefore, if the correct address is not present at the beginning of the second phase of the precharge cycle when the $VP_1$ voltage returns to ground, the charges on transistors 19 and 23 will both be removed by conduction of one or more of the decoder transistors. Thus when $VP_2$ goes to ground, the charge on transistor 21 will remain and the $V_{NA}$ supply will be connected to the gate line 27.

If the correct address is present when precharge voltage $VP_2$ returns to ground, however, the charges on transistors 19 and 23 will remain since they can no longer be removed by conduction through the decoder transistors. The precharge on the input to transistor 21 will be dissipated through transistor 19 while transistor 23 remains in conduction. Under these conditions, an address voltage $V_A$ will be connected to the gate line 27.

The operation of the Y decoder circuit is similar to that of the X decoder circuit. If the bank of decoder transistors 31 is addressed, the transistor 35 will remain conductive after the termination of the $VP_2$ pulse so that a chip enable voltage will be applied to the switching transistors 39 and 41 in the circuit 43. If, however, the decoder bank 31 is not addressed, the transistor 37 will remain conductive after the termination of the $VP_2$ pulse so that a ground potential will be applied to the transistors 39 and 41 in the circuit 43.

During phases 1 and 2, which constitute the precharge cycle, the source line transistor 47 and the drain line transistor 49, and their equivalents in the remaining I/O and storage circuits, are driven into conduction so that all source lines are precharged to the negative level of the chip enable voltage and all drain lines are grounded.

Thus, during precharge, all memory matrix lines are connected to pulse voltage sources that will provide the proper voltages later for READ and WRITE functions. The precharging operation need not be repeated until the next operating cycle, since the decoders will continue to store the address conditions selected during phases 1 and 2.

During phase 3 or "load," the contents of the addressed row must be stored in the I/O and store circuits. Since the memory matrix organization requires that an entire row of information, i.e., 64 bits, be written simultaneously, the contents of the entire row must be temporarily stored in the circuit 43 before writing of a selected bit can begin.

As can be seen from FIG. 3, CE and $V_R$ voltages as well as a reduced $V_A$ voltage are present during phase 3. The reduced $V_A$ voltage is applied to the gate electrodes in all of the memory transistors in the addressed row by means of the gate line 27. This reduced $V_A$ voltage serves as a READ voltage. At this time, the transistors 49 and 51 in the circuit 43 and their equivalents in the remaining I/O and storage circuits are maintained in conduction by the gate voltage $V_R$. Thus information stored in each memory transistor in the addressed row is transferred to the gate of a temporary storage transistor such as the transistor 53. It will be noted that this information is also applied to the gate electrode of the readout transistor such as the transistor 59. Furthermore, in the case of the memory transistor selected by the Y decoder circuit, a gate voltage will be applied to the output switching transistor 41 so that an output voltage corresponding to the information read out of the selected memory transistor will be available at the output terminal during phase 3.

If the conduction threshold of a memory transistor had been previously set at its positive extreme, the transistor will conduct in response to the READ voltage, and the negative voltage level remaining from the precharge on the matrix source line will be returned to zero through the drain-source channel of the memory transistor and the drain line transistor 49. The gate electrode of the temporary storage transistor 53 will similarly be connected to ground potential through the transistor 51 and the grounded source line at this time.

If the threshold of the addressed transistor had been previously set at its negative extreme, however, it would remain cut off in response to the READ voltage applied to its gate electrode. The precharge voltage will remain on the source line so as to leave the temporary storage transistor 53 biased "on" at the end of phase 3.

During phase 4 (clear), the conduction threshold of each memory cell in the row containing the selected address is shifted to its most positive extreme. It will be remembered, however, that during this time the information originally stored in each of these memory cells is temporarily stored in the I/O and store circuitry.

Again referring to FIG. 3, it can be seen that during phase 4, $V_{NA}$ and CE voltages are present. Effectively, during phase 4, the X selection code is inverted and the WRITE potential is applied to the addressed row by switching the $V_A$ and $V_{NA}$ power supplies. Since $V_{NA}$ is at a negative level during phase 4, a negative voltage is applied to the substrate of the matrix 11 through conductor 25. The gate electrodes of the memory cells in the addressed row are now at ground level, however, since $V_A$ is now at ground level. Since $V_R$ is also at ground level during phase 4, the transistors 49 and 51 are cut off. Thus the gate electrodes of the memory cells in the addressed row are at a positive WRITE voltage with respect to the substrate, and the conduction threshold of each of these memory cells is shifted to its positive extreme. In the case of the non-addressed rows, the associated first buffer transistor corresponding to transistor 21 is conductive whereas the second buffer transistor corresponding to transistor 23 is non-conductive. Thus for the non-addressed rows, both the gate electrodes of the memory cells and the substrate are at the potential of $V_{NA}$ during phase 4 so that the conduction thresholds of the memory cells in the non-addressed rows remain undisturbed during phase 4.

During phase 5 (store), information in the addressed row is rewritten into the memory cells unless a WRITE command is received during this time interval so as to update the stored information.

At the inception of phase 5, $V_A$ and $V_S$ voltages are switched to a negative value. The CE voltage remains at a negative level; all other voltages are at ground level. Under these conditions, the gate electrodes of the memory cells in the addressed row will be at the negative WRITE potential ($V_A$). The gate electrodes of all memory cells in non-addressed rows will be at ground potential ($V_{NA}$). The matrix substrate, however, will be at ground potential during phase 5 so that all of the memory cells in the addressed row will have their gates and substrates biased so that their conduction thresholds would ordinarily be shifted to the negative extreme. However, this shifting of the conduction threshold can be inhibited selectively in accordance with the information to be written into the particular memory cell by means of a known "channel shielding" technique.

Since a negative $V_S$ voltage is present during phase 5, the load transistor 55 and the transmission gating transistor 57 are driven into conduction. If the temporary storage transistor 53 has a negative gate voltage at this time, the matrix source line will be driven close to ground potential since both transistors 53 and 57 will be conducting. Application of the negative gate voltage to the associated memory transistor will then cause the conduction threshold of that transistor to be shifted to its negative extreme.

However, if the temporary storage transistor 53 does not have a negative voltage stored at its gate electrode, the transistor will be in the non-conducting condition. The matrix source line will now be coupled through the transistor 57 and the transistor 55 to the negative chip enable voltage. This voltage, however, is essentially at the same level as the address voltage $V_A$. Under these conditions, the gate dielectric of the particular memory cell is "shielded" from the substrate voltage and will experience no voltage drop. Therefore, shifting of the conduction threshold in this memory cell will be inhibited.

Thus after the store function is performed in phase 5, each memory cell in the addressed row will be returned to the state that it occupied at the beginning of the load function in phase 3.

Assume, for instance, that the conduction threshold of a given memory cell in an addressed row was at its negative extreme at the beginning of phase 3. The memory cell would effectively be cut off under these conditions and after application of the $V_A$ READ potential, the gate electrode of transistor 53 would be at a negative potential. During phase 4, the conduction threshold of the selected memory cell would be shifted to its positive extreme. However, during application of the WRITE potential in phase 5, the conduction threshold of the memory cell would be returned to its negative threshold.

On the other hand, if the conduction threshold of the selected memory cell was originally at its positive threshold limit, the memory cell would be in a conductive state and upon application of the $V_A$ READ potential the gate electrode of the transistor 53 would fall to ground potential. During application of the WRITE potential in phase 5, the source line would be at a negative potential which would inhibit shifting of the conduction threshold of the selected memory cell and its conduction threshold would remain at the positive extreme.

Since the memory cells in the non-addressed rows are isolated from the $V_A$ READ and WRITE potentials, they are unaffected by the load, clear and store phases.

The foregoing explanation has assumed that information read out of the various memory cells in the addressed row during phase 3 was to be temporarily stored in transistor 53 and then rewritten into the memory cell. If a new bit of information is to be written into the selected memory cell, however, a WRITE command signal will be applied to the WRITE input terminal of the circuit 43 and a signal having the proper binary value will be applied to the voltage input terminal of the circuit 43. The input switching transistor 39 corresponding to the selected column in the memory matrix will be driven into conduction by a voltage from the Y decoder circuit. Thus the binary input signal can be applied to the gate electrode of the temporary storage transistor 53 where it will dominate any charge that may have been stored at the input capacitance of that transistor during the previous phase 3 (load) operation so as to effectively update the information being stored in the temporary storage register.

The foregoing description indicates the mode of operation when the memory is to be used as a READ/WRITE memory. It will be appreciated, however, that the memory may be operated in a read-only mode by using only phases 1 through 3. Under these conditions, a large but limited number of interrogations can be performed without significantly disturbing the conduction thresholds of the various memory cells.

The X and Y decoders illustrated in FIG. 2 operate on a majority code. However, any other code could be used so long as selection occurs for all lines at "-ground" potential.

The push-pull dynamic buffer of the X decoder provides low impedance clamps to non-addressed as well as addressed gate lines in the memory matrix. This minimizes capacitive-coupled cross-talk in the memory matrix since the capacitance from common source lines to common gate lines are of the same magnitude as the capacitances to the substrate.

The temporary storage feature of the circuit permits the use of single bit input/output connections. This, in turn, permits fewer pin connections and lower cost. The temporary storage feature also permits the entire memory to be periodically refreshed so as to compensate for threshold drift of the memory devices caused either by repeated readout functions or long-term unbiased storage.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. A digital memory employing a matrix of variable threshold transistor memory cells arranged in rows and columns on a common substrate; each of said memory cells containing gate, source and drain electrodes; first decoder means for applying an address voltage to the gate electrodes of all cells in a given row and a non-addressed voltage to the gate electrodes of all remaining cells and to said substrate; said given row being uniquely determined by the value of address input signals received by said decoder means; individual I/O and storage circuits for applying drain and source potentials to each column of memory cells; means in each I/O and storage circuit for temporarily storing information read out of an addressed memory cell in the corresponding memory column; second decoder means for supplying a switching signal to a given I/O and storage circuit, said given circuit being uniquely selected by the value of address input signals applied to said decoder from an exterior source; means responsive to said switching signal for providing a single bit of output information corresponding to the information read into the temporary storage circuit selected by said second decoder means; means to apply updated information to said I/O and storage circuit; means responsive to said switching signal for updating the information in the temporary storage means corresponding to the I/O and storage circuit selected by said second decoder; means to clear all memory cells in the selected row; and means to re-write information from said temporary storage means into the corresponding memory cell.

2. The digital memory of claim 1 wherein said first decoder means includes pairs of buffer transistors for selectively coupling each gate line in the matrix to sources of address and non-address voltages in response to received address input signals whereby all gate lines are maintained at definite predetermined potentials.

3. The digital memory of claim 2 wherein said second decoder means includes means to apply a switching signal to the I/O and storage circuit corresponding to a selected matrix column and wherein each I/O and storage circuit includes input and output switching transistors through which information can be read into and out of that I/O and storage circuit during the reception of a switching signal.

4. The digital memory of claim 3 wherein the temporary storage means in each I/O and storage circuit includes a storage transistor, said storage transistor having a gate electrode selectively coupled to the source electrodes of all memory cells in the corresponding matrix column and to the associated input switching transistor so that a bit of information can be applied to the storage transistor gate electrode from a memory cell as well as from an external source.

5. The digital memory of claim 4 wherein the gate electrode of the storage transistor is coupled to the source electrodes of the memory cells in the associated matrix column through a gating transistor and wherein the drain electrodes of the same memory cells are selectively coupled to ground through a drain line transistor; said source line transistor and said drain line transistor being actuated by a common READ pulse so as to apply a gate voltage to the storage transistor in accordance with information stored in the addressed memory cell in the associated matrix column.

6. The digital memory of claim 5 wherein the means to re-write information into a memory cell includes means to supply a negative chip enable voltage having a magnitude suitable for writing information into a memory cell to the corresponding I/O and storage circuit; said I/O and storage circuit further including a load transistor connected in series relationship with said storage transistor between said chip enable voltage supply means and ground; said I/O and storage circuit still further including a transmission gating transistor for selectively coupling the junction between said load transistor and said storage transistor to the source electrode of the associated memory cell; said load transistor and said storage transistor being actuated by a common store pulse whereby a voltage of substantially ground potential may be applied to the source electrode of the memory cell when the storage transistor is in a conducting state and a voltage of substantially WRITE potential may be applied to the memory cell when the storage transistor is in a non-conducting state.

7. A digital memory comprising a matrix of variable threshold transistor memory cells arranged in rows and columns on a common substrate, each of said variable threshold transistor memory cells being characterized in that it exhibits a conduction threshold which may be shifted to a positive or a negative limit in response to a gate-substrate WRITE pulse of corresponding polarity, each of said variable threshold transistor memory cells being further characterized in that a negative-going READ pulse will drive the memory cell into conduction when and only when the conduction threshold of said cell has been shifted positively, an individual gate line corresponding to each of said rows and interconnecting the gate electrodes of all memory cells in that row, individual source and drain lines corresponding to each of said columns interconnecting the source and drain electrodes respectively of all memory cells in that column, first and second decoder means coupled to receive a plurality of first and second address input signals respectively, said first decoder means including means to apply an address voltage to a different one of said gate lines for each combination of received first address input signals and a non-address voltage to the remainder of said gate lines and to said common substrate, individual temporary storage means corresponding to each column in said matrix for temporarily storing information read out of a memory cell in that column, means to establish a precharge cycle wherein a negative voltage is applied to all of said source lines and wherein all of said drain and gate lines are grounded, means to terminate said precharge cycle and to establish a load phase of operation wherein each of said temporary storage means is coupled to its respective matrix column and a READ pulse is applied to the addressed gate line whereby information is read into each temporary storage means in accordance with the state of the conduction threshold of the addressed memory cell in the corresponding column, said temporary storage means including means to maintain an output potential substantially at ground potential when the conduction threshold of the memory cell from which the information is read is at its negative limit and a potential substantially equal to a WRITE pulse when the memory cell is at its positive limit, means to terminate said load phase and establish a clear phase of operation wherein the non-addressed gate lines and said substrate are driven negatively by a pulse of WRITE magnitude and said addressed gate line is grounded whereby the conduction threshold of all addressed memory cells are shifted to their positive limits, means to terminate said clear phase and establish a store phase wherein said non-addressed gate lines and said substrate are held at ground potential and wherein a WRITE potential is applied to said addressed gate line and wherein the output of each of said temporary storage means is coupled to its respective matrix source line whereby the conduction thresholds of all transistors in the addressed row are reset in accordance with the output of the temporary storage means, individual signal output switching means coupled to each of said source lines for providing an output signal from a selected memory cell during said load phase, and individual signal input switching means coupled to each of said temporary storage means for providing a new bit of information to the corresponding memory cell during said store phase, said second decoder means including means to actuate the signal input and signal output switching means corresponding to a different one of said memory cells for each combination of received second addressed signals.

* * * * *